US005284044A

United States Patent [19]

Bier

[11] Patent Number: 5,284,044

[45] Date of Patent: Feb. 8, 1994

[54] WIRE JOINING DEVICE

[75] Inventor: Bruce Bier, Warren, N.J.

[73] Assignee: Richard's Manufacturing Company, Sales Inc., Irvington, N.J.

[21] Appl. No.: 868,624

[22] Filed: Apr. 14, 1992

[51] Int. Cl.[5] .............................................. B23P 11/00

[52] U.S. Cl. .............................. 72/453.07; 72/453.15; 72/453.16; 29/235; 29/243.56

[58] Field of Search ........... 72/453.02, 453.07, 453.15, 72/453.16, 410; 29/243.56, 235

[56] References Cited

U.S. PATENT DOCUMENTS 3,937,050 2/1976 Nicholson ........................ 72/453.16

FOREIGN PATENT DOCUMENTS 1427300 7/1969 Fed. Rep. of Germany ... 72/453.02
1627811 5/1972 Fed. Rep. of Germany ... 72/453.15

*Primary Examiner*—David Jones
*Attorney, Agent, or Firm*—Richard T. Laughlin

[57] ABSTRACT

A hydraulic wire joining device for connecting at least two wires. The device includes a hydraulic cylinder for clamping a wedge or spacer over at least two wires, and a work fixture for transmitting an cylinder force to the wedge. The cylinder is a two-stage type of cylinder, which has first and second coaxial cylinders and respective first and second coaxial pistons respectively forming the first and second chambers and third and fourth chambers. The first piston has passage means which has a pressure valve and which connects the first and third chambers upon opening of the pressure valve only at a second stage higher fluid pressure level, whereby a two-stage two-level force can be applied to the wedge for initial crimping and final crimping of the wedge.

8 Claims, 4 Drawing Sheets

WIRE JOINING DEVICE

The invention relates to a wire crimping device, and in particular, the invention relates to a stopped force wire crimping device having a two-stage hydraulic cylinder.

BACKGROUND OF THE INVENTION

The prior art wire crimping device widely used commercially includes a clamp for fastening together two or more wires and includes an explosive unit for applying a force to the clamp for crimping portions of the clamp over the wires.

Typical hydraulic crimping devices are shown in U.S. Pat. No. 4,796,461 issued Jan. 10, 1989 to Howard Mead; U.S. Pat. No. 5,065,609 issued Nov. 19, 1991 to Helmut Dischler; U.S. Pat. No. 4,136,549 issued Jan. 30, 1979 to Lytie, et al.; U.S. Pat. No. 3,786,669 issued Jan. 22, 1979 to Raydon A. Links; U.S. Pat. No. 3,017,905 issued Jan. 23, 1962 to C. H. Klein; U.S. Pat. No. 791,074 issued May 30, 1905 to H. A. Carpenter; and U.S. Pat. No. 2,158,855 issued May 16, 1939 to Eby, et al.

One problem with the prior art device is that the explosive unit causes a danger in the operation of the device.

SUMMARY OF THE INVENTION

According to the present invention, a wire joining device is provided. This device comprises a two-stage cylinder or actuator for applying a two level axial force, a clamp or mandrel for holding a pair of wires to be connected, a wedge for clamping together the wires in the mandrel by the force of one or more edges of the wedge, a clamp jaw supported by the fixture for holding the wedge and for transmitting the cylinder force through the jaw to the wedge and mandrel. The cylinder having first and second coaxial cylinders having respective first and second pistons respectively forming first and second chambers and third and fourth chambers for respectively applying a low level of the force and a high level of the force in a two-stage sequence.

By using the two-stage hydraulic cylinder, in place of the prior art explosive unit, the danger in operation of the device is minimized.

One object of the invention is to provide a wire joining device in which the danger of operation thereof is minimized.

Another object of the invention is avoid the use of any relatively dangerous explosive unit.

The foregoing and other objects, features and the advantages of the invention will be apparent from the following description of the preferred embodiment as illustrated in the accompanying drawings.

DESCRIPTION OF THE PREFERRED EMBODIMENT

Figure 1:
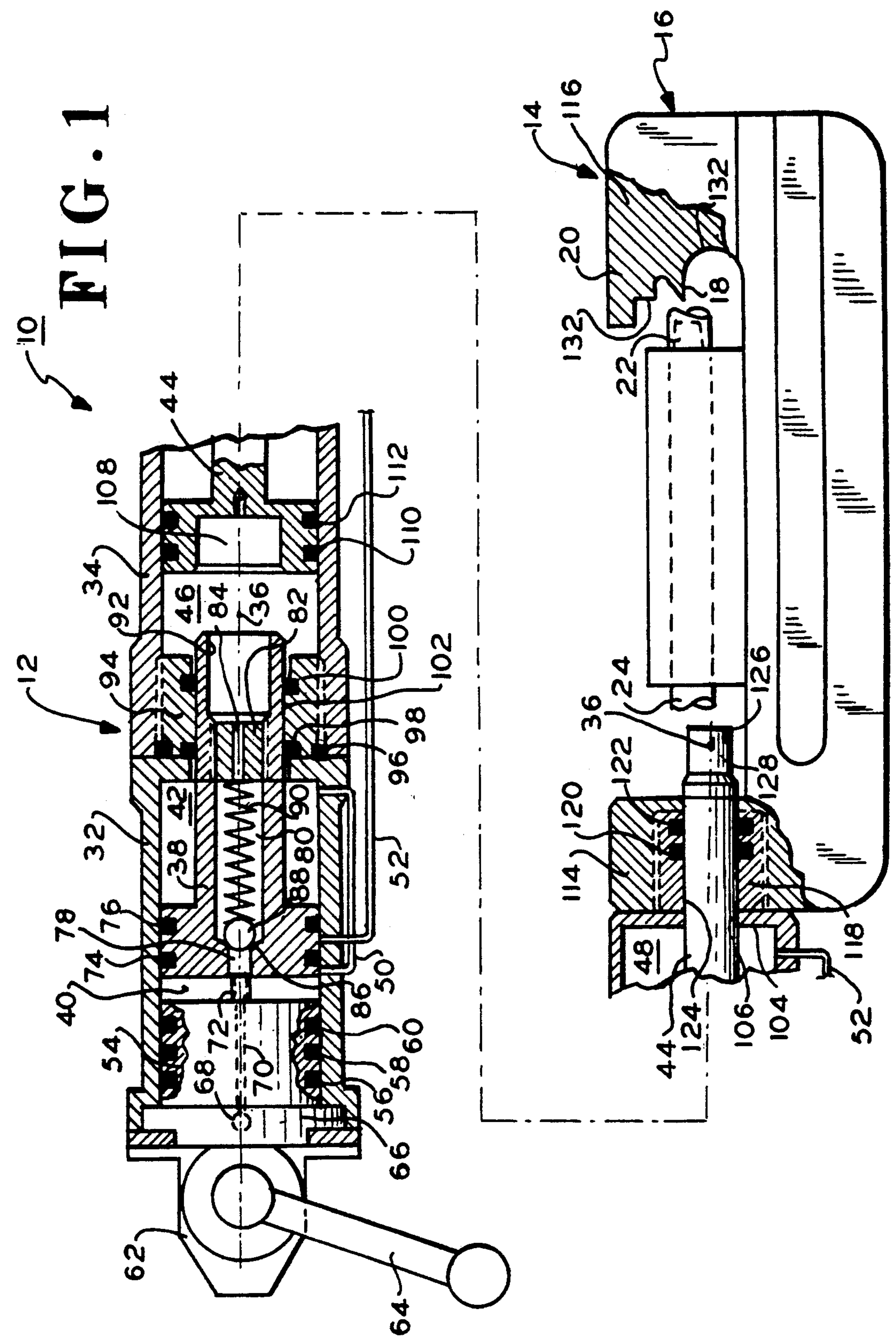
FIG. 1 is a sectional view of a hydraulic wire crimping device according to the present invention.
Figure 2:
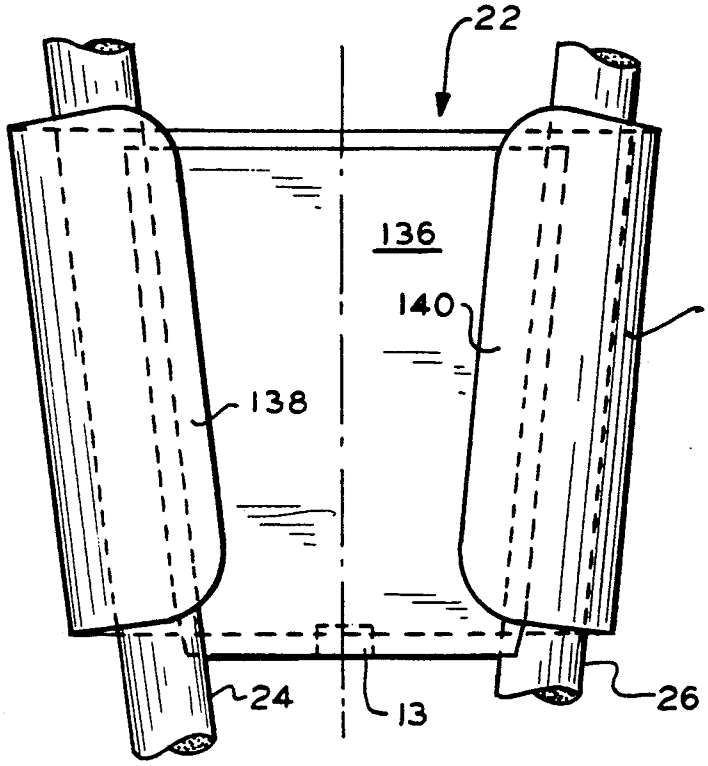
FIG. 2 is a bottom view of a clamp showing two cables composed of a bundle of wires.
Figure 3:
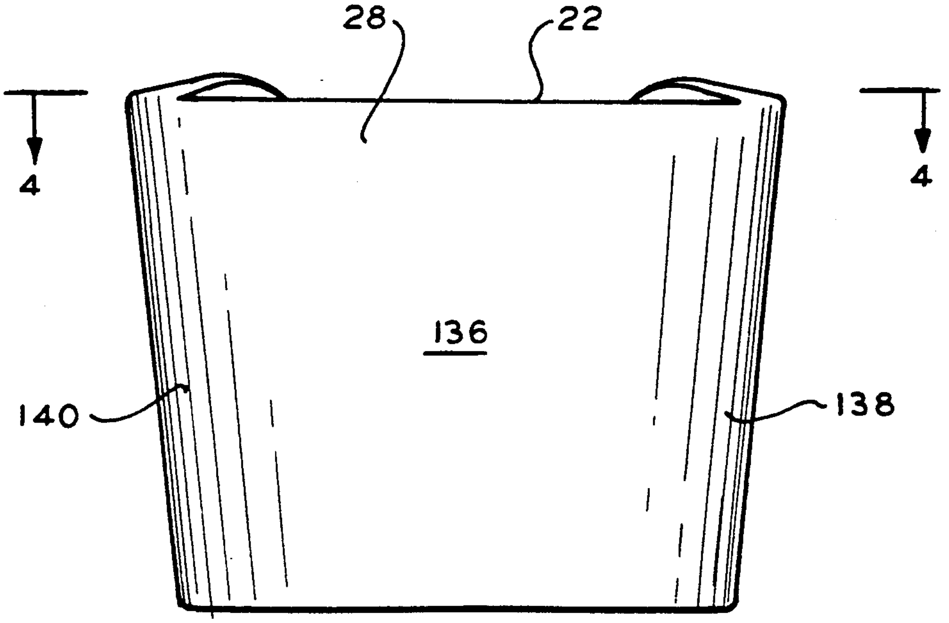
FIG. 3 is a top view of the clamp shown in FIG. 2 with the wedge inserted.
Figure 4:
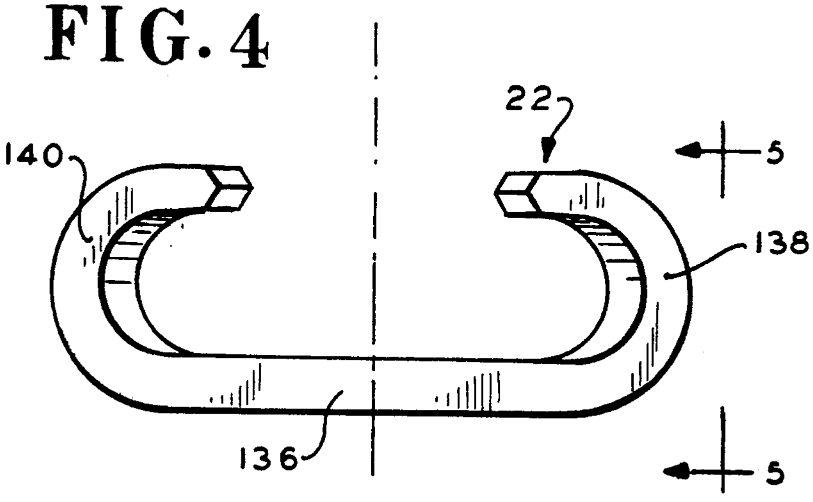
FIG. 4 is a top view as taken along line 4—4 of FIG. 3 with the wires and wedge removed.
Figure 5:
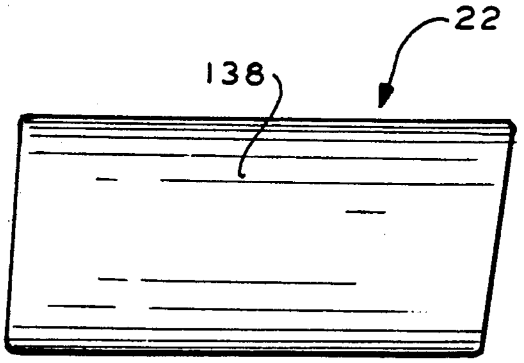
FIG. 5 is a side view as taken along line 5—5 of FIG. 4.

As shown in FIGS. 1 through 8, a hydraulic wire joining device generally indicated at 10 is provided.

Device 10 includes a hydraulic cylinder 12 and a work fixture generally indicated at 14. Fixture 14 has a base 16 and has a right closing jaw 20 which secures a wedge or spacer 22 in a mandrel or clamp 28 to secure left and right wires 24, 26 by means of a projection 18 on the jaw 20. The wires are separated by the wedge or spacer 22. Cylinder 12 applies a force from rod 30 through the wedge 22 and a reaction is applied by right jaw 20 on spacer 22 through projection 18 to press the spacer in place and force the wires in tight arrangement with the mandrel 28.

Cylinder 12 has a first cylinder 32 and a second cylinder 34 which are disposed along a common axis 36. First cylinder 32 has a first piston 38, which forms first and second chambers 40, 42. Second cylinder 34 also has a second piston 44, which forms third and fourth chambers 46, 48. First and second chambers 40, 42 are connected by a tube 50. First and fourth chambers 40, 48 are connected by a tube 52 after slight displacement of first piston 38.

First cylinder 32 has a left end wall 54, which has three conventional O-rings 56, 58, 60. Wall 54 supports a manual control valve 62, which has a handle 64. Wall 54 also has a round or annular plate 66, which has a transverse inlet fluid passage 68 for the drive fluid supplied by a source (not shown). Wall 34 has a central connecting passage 70 which connects to chamber 40. Passage 70 connects to a perforated outlet tube 72 disposed in chamber 40.

First piston 38 has two 0-rings 74, 76, of U-shaped cross-section. First piston 38 also has a bearing tube or sleeve 78, which is connected to an elongated cavity 80. First piston 38 also has a spring supporting insert body or tube 82, which has a central passage 84. Piston 38 also has a control valve 86. Valve 86 has a bearing ball 88 and a helical compression spring 90 which is disposed between bearing ball 88 and insert 82 within cavity 80. Spring 90 has a selective spring rate for opening ball 88 at a selective fluid pressure in chamber 40. First piston 38 also has an end cavity 92, which connects passage 84 to chamber 46.

Second cylinder 34 has a left end wall 94. Wall 94 has a conventional outer O-ring 96 and has two inner 0-rings 98, 100 of U-shaped cross-section. Wall 94 is threaded into cylinder 34 and has a central bore 102 for piston 38. Second cylinder 34 has a right end wall 104. Wall 104 has a wall bore 106 for second piston 44. Second piston 44 has an end face cavity 108 which permits fluid flow to chamber 46; and has two outer O-rings 110, 112 of U-shaped cross-section.

Fixture base 16 has left and right vertical walls 114, 116. Left wall 114 has a cylindrical sleeve 118, which is threaded therein. Sleeve 118 has two inner O-rings 120, 122 of U-shaped cross-section. Sleeve 118 has an inner bore 124, which receives piston 44.

Right jaw 20 has a selectively shaped outer surface 132 having projection 18. Clamp 28 has a web portion 136 and has left and right arcuate portions 138, 140, which are disposed over respective wires 24, 26.

Figure 6:
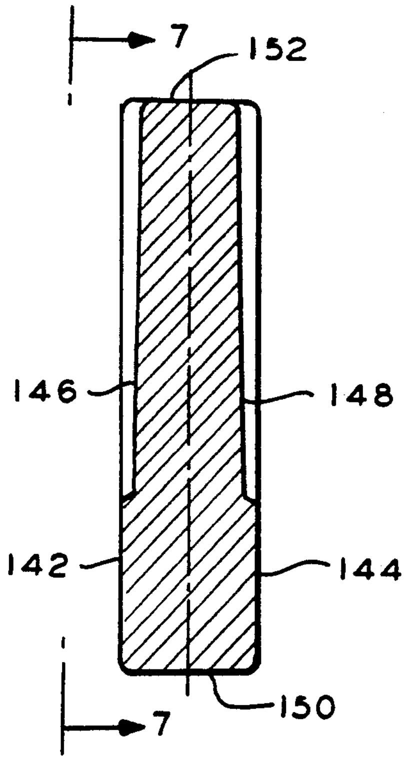
FIG. 6 is a section view as taken along line 6—6 of FIG. 7.
Figure 7:
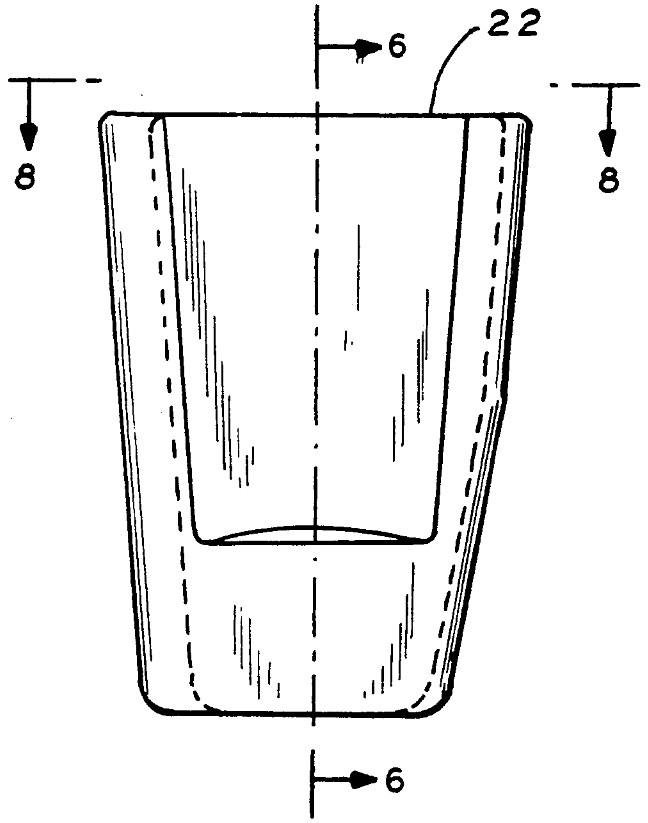
FIG. 7 is a top view of the wedge.
Figure 8:
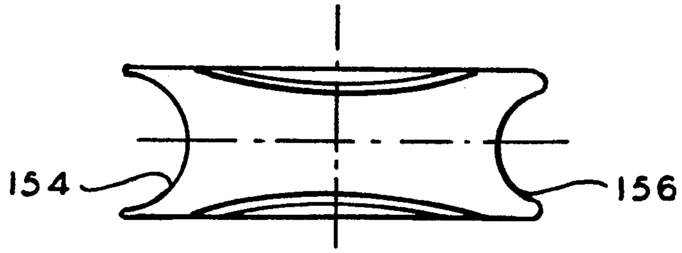
FIG. 8 is a side view as taken along line 8—8 of FIG. 7.

As shown in FIGS. 6, 7 and 8, wedge 22 has first and second faces 142, 144 which have respective recesses 146, 148. Wedge 22 also has bottom and top flat faces 150, 152, and has left and right side faces 154, 156 of concave semicircular shape. Faces 154, 156 receive respective wires 26, 24. After wires 24, 26 are connected together by clamp 28, wedge 22 is left in place between wires 24, 26.

In operation, the pressure in the primary piston is multiplied (increased) by a dual diameter secondary piston. Oil fills the pressure chamber of the primary piston first. Oil then fills the pressure chamber of the secondary piston causing the smaller diameter of the secondary piston to displace oil in the pressure chamber of the primary piston. The ratio of the diameters in the secondary piston provides a greatly increased pressure on the primary piston for a limited stroke. This combination is particularly useful in the application of a hydraulic compression tool for the installation of electrical connectors wherein it is desirable to advance the die at low pressure and closes at high pressure sequentially. The apparatus of the invention is a full-cycle device providing for a hydraulic power return of both pistons.

Wires 24, 26 are positioned inside clamp 28 using spacer or wedge 22. Then, the assembled wires 24, 26 and wedge 22 and clamp 28 are placed adjacent to jaws 20. Then, an operator turns a handle to admit pressurized pneumatic or hydraulic fluid, such as pumped water, oil or compressed air, through passage 68, then through passage 70, to cavity 40. The pressurized fluid moves first piston 38 relative to first cylinder 32, to the right in FIG. 1. First piston 38 is received in a cavity and engages second piston 44. First piston 38 then applies a force 30 to piston 44 urging piston 44 which applies this force 30 to wedge 22. A reaction to force 30 from fixture right wall 116 applies an opposite force to clamp portion 140. Then, the operator turns handle further to admit fluid at a selective higher pressure. The higher pressure fluid opens valve 86 and flows through elongated cavity 80, and through passage 84, and through cavity 92 to chamber 46. The high-pressure fluid in chamber 40 moves first piston 38 and the high-pressure fluid in chamber 46 moves piston 44 to the right in FIG. 1. Force 30 is increased to a higher selective value which is transmitted in a second stage through jaw 20 to projection 18. Thus, a two-stage force 30 is applied, which completely closes clamp 28 over wires 24, 26 and force wedge 22 in place by causing a portion 13 of the metal of the wedge 22 to rupture, thereby forming a tight fit.

The axial length of chamber 42 is longer than the length of travel of piston 38 through chamber 46 and recess 108. Thus, the force on piston 38 is transmitted to piston 44.

As piston 38 moves, tube 50 carries any fluid in chamber 42 back to chamber 40. As both piston 38 and piston 44 move together, tube 52 carries any fluid in chamber 48 back to chamber 40.

In FIG. 1, piston 38 is shown in its rearward inactive shutdown position. In its forward active position, piston 38 is in contact with piston 44.

During turn-off, such as when replacing the clamped wires 24, 26 and spacer 22, with two new unclamped wires and their spacer, piston 38 remains in its forward position, as the force 30 is below its low level and the jaw 20 is pulled open slightly as required.

At start-up, using a low level of force 30, piston 38 is moved to its forward active position, thereby increasing the axial length of chamber 40. Then, piston 38 applies a low level of force 30 on jaw 20, thereby initially closing the clamp 28 level of force 30 on jaw 20, thereby joining of the wedge ad clamp 21 initially in a first step. As a second step, the application of the higher level of force 30 completes the joining thereby forming the clamped assembly of wires 24, 26 and clamp 28 and spacer 22. During this second step spacer 22 is further wedged into clamp 28 and locked thereto by way of deformation or rupture 13 of a portion of the surface of the spacer.

The apparatus can be made in whole or in part from composite materials, adding to the strength of the apparatus.

The advantages of device 10 are indicated hereafter.

A) Cylinder 12 of device 10 can be used in place of the prior art explosive unit thereby avoiding the need for an explosive unit.

B) Device 10 provides a wire crimping device, in which the danger of operation is minimized.

While the invention has been described in its preferred embodiment, it is to be understood that the words which have been used are words of description rather than limitation and that changes may be made within the purview of the appended claims without departing from the true scope and spirit of the invention in its broader aspects.

For example, three or more wires can be connected together, in place of the two wires 24, 26.

As another example, differently shaped jaws can be used in place of jaw 20, to suit wires 24, 26 and wedge 22, or to suit other wire combinations and bar shapes.

As a further example, a different arrangement of fluid passages and related piping can be used, to connect to chamber 40.

What is claimed is:

1. A device for securing in a two stage operation two electrical wires together with a spacer between the wires by a connector clamp securely surrounding the wires and the spacer comprising:

a connector clamp for extending around the two wires;

a spacer within the clamp for maintaining separation between the two wires, a two stage compound hydraulic or pneumatic fluid cylinder having first and second coaxial cylinders and respectively first and second coaxial pistons forming first and second chambers in the first cylinder and third and fourth chambers in the second cylinder;

jaws affixed to one end of the second piston rod;

a work fixture affixed to one of the jaws capable of gripping the clamp and locking the wedge into the clamp by rupturing a portion of an outer surface of the wedge;

a passage means containing a pressure valve which connects to the first and third chambers, said pressure valve upon the application of increased pressure will open to allow fluid into the secondary cylinder whereby a two-stage two-level force can be applied to the spacer for first initial joining and at the second pressure a final joining of the wires in the connector;

said second piston having a dual diameter and a second pressure chamber for increasing the pressure in the first piston whereby fluid fills the pressure chamber of the first piston first and then fills the pressure chamber of the second piston, said second piston having a smaller diameter causing the second piston to displace fluid in the pressure chamber of the first piston, and wherein the ratio of the diameters in the second piston provides a greatly increased pressure on the primary piston for a limited stroke; the wires and the spacer and clamp are joined initially by the application of the low pressure and the higher pressure completes the joining thereby forming the clamped assembly of wires, clamp and spacer and the spacer is locked therein by way of rupture of a portion of a surface of the spacer.

2. The device of claim 1, including:

said spacer being disposed between the wires;

inlet passage means for supplying a fluid at a low level or high level pressure to the first chamber;

control means for controlling the fluid pressure level in the first chamber; and said first piston having second passage means having an automatic pressure valve connecting the first chamber to the third chamber for supplying a high level fluid pressure to the third chamber form the first chamber;

3. The device of claim 2, including:

a first tube connecting the first chamber to the second chamber;

a second tube connecting the first chamber to the fourth chamber; an said first and second pistons each having a pair of seal rings for respectively sealing the first and second chambers and the third and fourth chambers.

4. The device of claim 2, wherein said automatic pressure valve comprises:

a bearing tube;

a bearing ball for sitting on the bearing tube;

a helical compression spring for applying a spring force on the ball; and a spring-supporting insert body for supporting the spring.

5. The device of claim 2, wherein said fixture has a base portion and wall portion for bearing against the jaw for deforming the spacer;

said wall portion having a hole facing the cylinder in which a portion of the second piston is received for applying a cylinder force on the jaw;

said hole having a sleeve having a bore portion in which the portion of the second piston is fitted; and said jaw having a cavity in which an end portion of the second piston is fitted for transmitting the cylinder force through the jaw to the spacer.

6. The device of claim 5, wherein said jaw has a selectively shaped respective inner surface for engaging and crimping respective arcuate portions of the spacer; and said jaw has selectively shaped respective outer surfaces for bearing against the respective fixture wall portions.

7. A method for clamping two electrical wires together which comprises, positioning the two electrical wires in a metal clamp separated by a spacer, applying to the clamp and spacer a device comprising a hydraulic cylinder for initially joining a connector over the two wires with a spacer between the wires; positioning a work fixture having a surface for gripping the clamp and spacer which grips the wires; said cylinder having a first piston forming first and second chambers fir initially combining the wires, the spacer and the clamp in place; and having a second piston forming third and fourth chambers for completing the joining of the wires, spacer and clamp and for rupturing a portion of a surface of the spacer to hold it in place.

8. The method of claim 7, including:

supplying a fluid at a low level or high level pressure to the first chamber through inlet passage means;

controlling the fluid pressure level in the first chamber; and supplying a high level fluid pressure to the third chamber form the first chamber.

* * * * *